United States Patent
Schreib et al.

(10) Patent No.: US 11,313,972 B2
(45) Date of Patent: Apr. 26, 2022

(54) GEO-REFERENCING IDENTIFICATION (GRID) TAG

(71) Applicant: AECOM, Los Angeles, CA (US)

(72) Inventors: Benjamin Schreib, Baltimore, MD (US); Michael House, Laurel, MD (US); Samuel McClintock, Williamsburg, VA (US); David Rein, Ann Arbor, MI (US); Navid Yazdi, Ann Arbor, MI (US)

(73) Assignee: AECOM, Los Angeles, CA (US)

( * ) Notice: Subject to any disclaimer, the term of this patent is extended or adjusted under 35 U.S.C. 154(b) by 416 days.

(21) Appl. No.: 16/328,201

(22) PCT Filed: Aug. 23, 2017

(86) PCT No.: PCT/US2017/048236
§ 371 (c)(1),
(2) Date: Feb. 25, 2019

(87) PCT Pub. No.: WO2018/044654
PCT Pub. Date: Mar. 8, 2018

(65) Prior Publication Data
US 2019/0219703 A1    Jul. 18, 2019

Related U.S. Application Data

(60) Provisional application No. 62/382,112, filed on Aug. 31, 2016.

(51) Int. Cl.
*G01S 19/16* (2010.01)
*G01S 5/00* (2006.01)
(Continued)

(52) U.S. Cl.
CPC ............ *G01S 19/16* (2013.01); *G01S 5/0072* (2013.01); *G01S 5/0081* (2013.01); *G01S 19/03* (2013.01);
(Continued)

(58) Field of Classification Search
CPC ........... G01S 19/16; G01S 19/03; G01S 19/49
(Continued)

(56) References Cited

U.S. PATENT DOCUMENTS

| | | | |
|---|---|---|---|
| 2013/0063300 A1* | 3/2013 | O'Regan | G01S 19/14 342/357.25 |
| 2015/0078125 A1* | 3/2015 | Falter | G01S 7/523 367/8 |

FOREIGN PATENT DOCUMENTS

EP    0 748 080 A1    12/1996

OTHER PUBLICATIONS

International Search Report Issued in International Application No. PCT/US2017/048236 dated Dec. 15, 2017 in 2 pages.
(Continued)

*Primary Examiner* — Bo Fan
(74) *Attorney, Agent, or Firm* — Knobbe, Martens, Olson & Bear, LLP

(57) ABSTRACT

A system for tagging and tracking assets anywhere in the world under any environmental condition. Geo-Referencing Identification (GRID) tag, GRID satellite (GRIDSAT) tag and associated cloud infrastructure and user interface meet the objectives of a robust global tagging and tracking system. The GRID tag can be used to identify pieces of equipment or storage containers for low-value or aggregate equipment. GRID tags communicate with each other using a mesh radio in each tag. The GRIDSAT tag consists of a satellite modem, global positioning system (GPS) receiver, and mesh radio and can be used by itself for high-value
(Continued)

items, large shipping containers, or vehicles and vessels to track and locate them, or used in concert with GRID tags that communicate with each other and with the GRIDSAT tag by means of mesh radio.

9 Claims, 4 Drawing Sheets

(51) Int. Cl.
| | |
|---|---|
| *G01S 19/14* | (2010.01) |
| *G06Q 10/08* | (2012.01) |
| *H04W 4/70* | (2018.01) |
| *G06K 7/10* | (2006.01) |
| *G06K 19/07* | (2006.01) |
| *G01S 19/03* | (2010.01) |
| *G01S 19/49* | (2010.01) |
| *G01W 1/02* | (2006.01) |
| *H04W 84/18* | (2009.01) |

(52) U.S. Cl.
CPC .............. *G01S 19/14* (2013.01); *G01S 19/49* (2013.01); *G01W 1/02* (2013.01); *G06K 7/10366* (2013.01); *G06K 19/0717* (2013.01); *G06K 19/0723* (2013.01); *G06Q 10/08* (2013.01); *H04W 4/70* (2018.02); *G06Q 10/087* (2013.01); *H04W 84/18* (2013.01)

(58) Field of Classification Search
USPC ........................................ 342/357.25, 357.54
See application file for complete search history.

(56) References Cited

OTHER PUBLICATIONS

Written Opinion of the International Searching Authority Issued in International Application No. PCT/US2017/048236, in 6 pages.
International Preliminary Report on Patentability for International Application No. PCT/US2017/048236 dated Mar. 5, 2019, in 8 pages.

* cited by examiner

GEO-REFERENCING IDENTIFICATION (GRID) TAG

CROSS-REFERENCE TO PRIOR APPLICATIONS

The present application is based on and claims priority and benefit of U.S. Provisional Patent Application No. 62/382,112, filed 31 Aug. 2016.

U.S. Government Support

Not Applicable

BACKGROUND OF THE INVENTION

Area of the Art

The present invention has to do with asset measurement and control and is specifically directed to an advanced Radio Frequency Identification (RFID) tag-based asset management system.

Description of the Background

Managing "assets" is an increasingly complex tasks of modern governments and corporations. Generally, asset management implies a semi-automated process of caring for valuable or important items. For example, a company could track all of the components used in a large manufacturing facility and verify that everything is working properly and plan for upgrade and replacement. Asset management can be applied to some extent to virtually any project. It turns out that managing assets for response to remote emergencies is particularly challenging.

Take, for instance, emergency response to an oil well spill or blow-out; an oil well mishap is not guaranteed but is certainly a possibility of petroleum exploration and production. An uncontrolled spill or well blow-out can be a major environmental disaster. Particularly since drilling often occurs in remote and environmentally sensitive regions. Therefore, particularly for remote locations, spill responses must be organized and set up in advance. However, the precise equipment needed for an emergency response depends on the location and geographical characteristics of a well site. To respond to a well leak under the water as in the Gulf of Mexico is quite different that controlling a runaway well in the arctic. So special equipment must be organized and shipped to an appropriate location in reasonable proximity to the well site. Making certain that the correct equipment is placed in the correct location is an important extension of asset management. It will be appreciated that these consideration apply to response equipment for fire, earthquake, flood, conflict or any other emergency situation.

Until now managers have been forced to depend on the original requisition and shipment records. If the remote location is constantly manned or reasonably accessible, personnel can be sent out to verify the existence of the correct pieces of equipment at the remote site. If the site is essentially inaccessible, management may just have to hope that the original shipment records are correct. Furthermore, with remote locations there is a significant possibility that one or more of the emergency components may be purloined. Therefore, a means to verify the presence of various assets in remote locations is required. It is also advantageous if any movement of the assets be automatically reported to management. Currently there is no systems to carry out this task in an automatic or semi-automatic manner.

SUMMARY OF THE INVENTION

The current invention provides a system that can be used to tag and track assets anywhere in the world and under any environmental condition to increase the user's situational awareness of equipment, assets, and resources before, during, and after their deployment. The system comprises the Geo-Referencing Identification (GRID) tag, GRID satellite (GRIDSAT) tag and associated cloud infrastructure and user interface to meet the objectives of a robust global tagging and tracking system.

The holistic "GRID" system used to track material movement, storage and deployment consists of several distinct parts:

1. The GRID tag used to identify unique pieces of equipment or storage containers for low-value or aggregate equipment. The GRID tag resembles traditional RFID tags except that the tags are able to communicate with each other. GRID tags only communicate with each other using a mesh radio in each tag. However, they can also communicate with a GRIDSAT tag and thereby to a satellite system, through the satellite gateway and on to the cloud infrastructure for processing and display to the end User.
2. The GRIDSAT tag which can be used by itself for high-value items, large shipping containers, or vehicles and vessels to track and locate them, or used in concert with GRID tags that communicate with each other and with the GRIDSAT tag by means of mesh radio. The GRIDSAT tag consists of a satellite modem, global positioning system (GPS) receiver, and mesh radio.
3. The satellite system that the GRIDSAT tag communicates through, by default because of extreme latitudes for some of the target locations, is the Iridium system. The Iridium network is not described in this application, but is referred to often. It will be appreciated that other satellite systems can be substituted depending on the locations, etc. that the GRIDSAT will be used in.
4. The GRID server and database which includes all pieces of the cloud Infrastructure and GIS (Geographic Information System) software, including a database to house all applicable tracking data, and a user interface for extracting and analyzing the information.

The GRID and GRIDSAT tags provide the end-users with an active radio frequency identification (RFID) system that:
1. Can be deployed to track any emergency response vehicle or asset anywhere in the world.
2. Does not require setting up field infrastructure including any local network, power lines or local RFID portal to read the tags. Unlike typical RFID systems, the GRID/GRIDSAT system can operate autonomously over a wide-area while fully untethered.
3. Utilizes a self-healing mesh network that can alter the pathway for tag communications to other GRID and GRIDSAT tags.
4. Is powered but remains in a low power "sleep" state until "awoken" by a sensor driven event (such as accelerometer output) and/or a software schedule.
5. Utilizes the open-source IPv6 over Low-Power Wireless Personal Area Network (6LoWPAN) wireless technology, providing flexibility in future end-user configurations and use cases.

A trade study and COTS ("commercial, off the shelf") assessment of available satellite communication services and satellite tracking providers was performed early in the inventive process for tags that were predominantly designed for asset tracking. The items, components, services, and software targeted in the study were the primary components of Radio-Frequency Identification systems necessary for positioning and communication through satellite systems: radio frequency modules, GPS modules, antennas, accelerometers, batteries, and support infrastructure. It was determined that all internal components chosen would have to operate in marine arctic environments where the tag would have to be saltwater- and corrosion-resistant, and be able to function down to at least −40° Celsius.

A primary operational focus of the GRID tags is on deployed resources, such as vessels arriving to assist in a spill or other disaster response. The tagging and monitoring of pre-positioned assets such as oil response equipment in storage and in transit is a secondary focus.

The inventive system can be readily modified for various remote tracking tasks. The embodiment that is described in detail below has two main environmental sensor inputs to the controller for all tags; namely, a voltage input for verifying battery status and a motion sensor (accelerometer, gyroscope or similar device). In addition the GRIDSAT tag has a GPS receiver and antenna that reports GPS location data. Any of a number of additional sensors can be provided to extend the usefulness of the system. Temperature sensors can allow the system to automatically respond to changes in the local environment. Apart from radio systems other types of electromagnetic energy sensors can be added so that the system can respond to changes in illumination or X-ray gamma ray levels; also radiation sensors can allow the system to respond to particulate radiation (alpha or beta radiation).

Sonic transducers can be particularly useful and provide a system for tracking ice floes and icebergs. A special versions of the GRID and GRIDSAT tags are used for this purpose. The GRID tag components are sealed in a waterproof spherical shell for emplacement in the underside of or within an ice floe by a submersible or similar device. In this embodiment of the GRID tag, the accelerometer is replaced by a pressure sensor which allows the device to respond to depth changes. The mesh radio is replaced by a subsurface transducer and a Lamb/Rayleigh Wave transducer. The GRIDSAT tag has a Lamb/Rayleigh detector/transducer in place of the mesh radio. The GRIDSAT is emplaced on the top of the ice floe and can be designed for emplacement by air drop. The GRIDSAT Lamb/Rayleigh detector/transducer can transmit a sonic "ping" into the ice. The GRID tag detects this by means of its subsurface transducer and responds by outputting "guided waves" (Lamb waves and Rayleigh waves) which encode data and can be detected through the ice by a GRIDSAT tag at a distance of 100 ft. to 2500 ft. (30.5 m to 762 m). It will be appreciated that for ice/water transmission, the mesh radio is omitted because it is of limited utility under these conditions. This system allows the GRIDSAT tags to locate any GRID tags associated with the ice floe and transmit their identity along with its own location and identity to the remote user by means of satellite. Movement of the ice floe is constantly recorded and the user is kept appraised of the geographical location of the ice. In addition, pressure changes in the GRID tags are reported as well as presence of the GRID tags. Changes in the GRID tags can signal breakup of the ice floe.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide RFID asset management for remote locations.

Quality Function Deployment (QFD) is a structured approach to defining customer needs or requirements and translating them into specific plans to produce products to meet those needs. In the case of the GRID and GRIDSAT tags, the initial requirements were both specific and derived from subsequent tests:

Small;
Inexpensive;
Automatically inventory all response equipment in real time;
Indicate location during storage and deployment;
Maximize the use of commercial-off-the-shelf (COTS) parts;
Compatible with the marine environment;
Satellite communications for global coverage;
Vibration power generator for increased functionality during equipment deployment;
Real time updating of inventory database;
Wireless Network→Mesh network for robustness (link healing);
Range (mesh): 100-500 feet;
Battery Life 6 months-2+ years (power management);
Temperature range: −40° C. to 85° C.;
Military standard 883 specifications for vibration and shock (durability); and
IP67 packaging specifications (water resistance and durability).

The present invention supports inventory, transit, staging, deployment, and response. Equipment and assets can be identified and tagged while in storage so that the user knows which assets are available and where. The GRID and GRIDSAT tag's low power storage mode allows intelligent power management, with timely communication. If an incident occurs that requires a response, the user can track assets as they are moved from inventory to a forward staging area. Through the mesh network, GRID tags can communicate through other GRID tags to a GRIDSAT tag, which then relays the entire message through the satellite communication network with location, time, identification, and status information to the mapping user interface or common operating picture. At the staging area, resources can be assigned and deployed into action. Once equipment, personnel, and other resources are deployed into the field during a response, the system automatically reports their information and location for ease of use to enhance situational awareness. Low power consumption enables tagging of equipment while in storage to allow for the identification and inventory of available resources. Resources at a staging area can be assigned and deployed to any user. GRID tags form a local mesh network and message to a GRIDSAT tag that automatically reports resource information to a remote management center for identification and tracking during a response.

Figure 1:
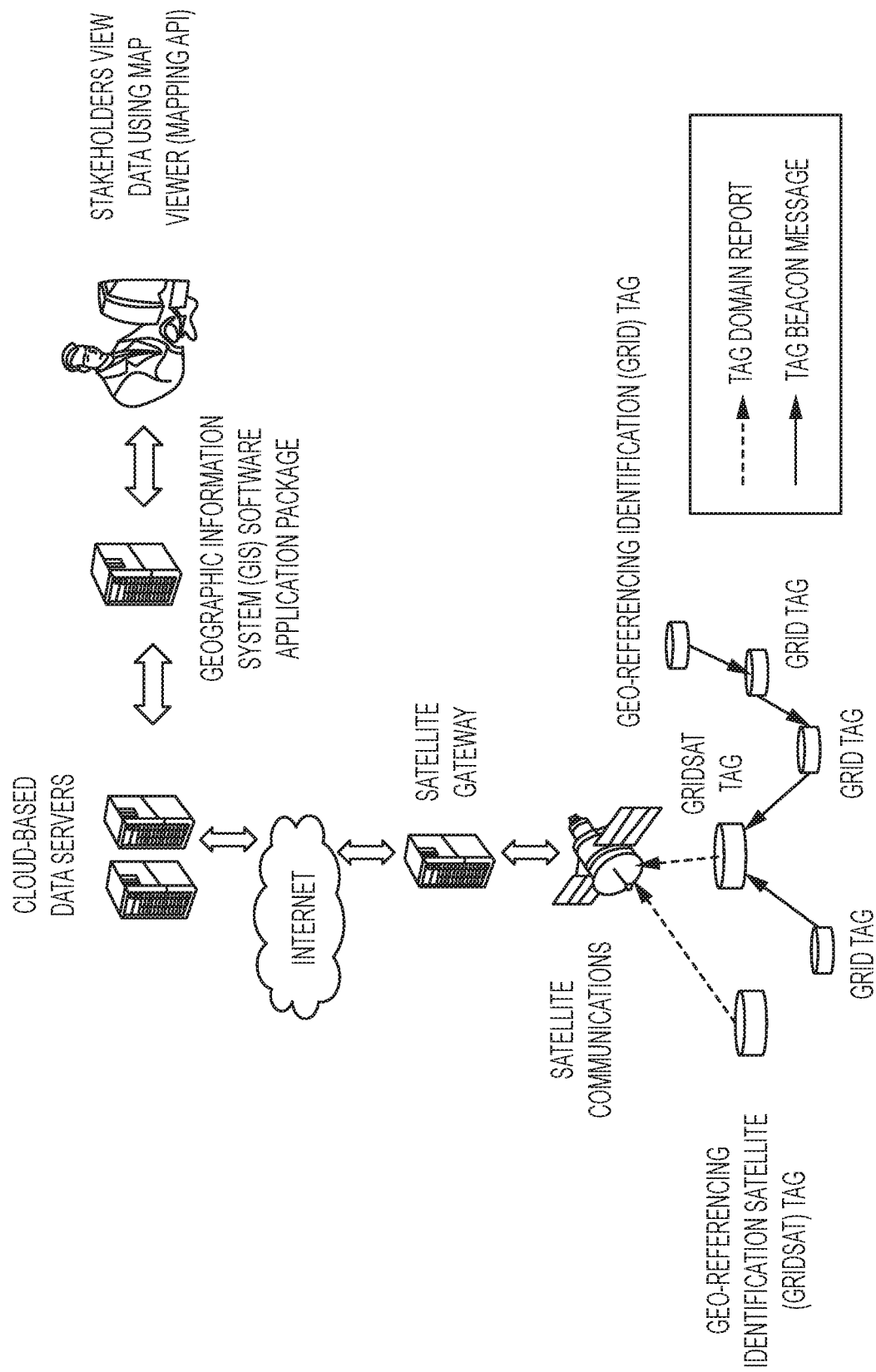
FIG. 1 is a diagram of the various components and how they communicate.

FIG. 1 shows how the various components interact to form a complete system. GRID tags 10 are deployed on various pieces of equipment and containers of supplies. As is detailed below, the individual GRID tags use low power mesh radio to send data (Tag beacon message 12) to communicate with nearby GRID tags 10. GRID tags 10 can also communicate by mesh radio with a GRIDSAT tag 14. The GRIDSAT tag 14 is used to tag key pieces of equipment. Not only can the GRIDSAT tag 14 receive messages from GRID tags 10, it has a GPS receiver allowing it to determine its geographical location. It can then transmit (Tag Domain Report 16) its location as well as information received from the GRID tags 10 by means of a satellite modem and antenna to a communication satellite 18. This information is passed through a Satellite Gateway 20 to the Internet 22 and on to cloud-based servers 24 where GIS software 26 can provide a stakeholder user 28 with various graphical representations of the precise location of the various tagged assets. This should be contrasted to a typical RFID system where active or passive tags transmit their identity to a nearby reader. In the inventive system, the GRID tags 10 communicate to nearby GRID tags 10 creating a mesh network from which the identity of all the Tag members can be determined. The mesh network includes any nearby GRIDSAT tags 14 which add GPS location information to the network information and transmit the GPS information as well as the identity of all tags to a remote user 28.

The messages that can be passed between the GRID tags to the GRIDSAT tags and on to the satellite gateway are summarized as:

GRID tag Message Format to GRIDSAT tag: A payload of User Datagram Protocol (UDP) packets are sent over the tag mesh network. UDP packet format and mesh protocol have routing and cyclic redundancy check fields, and are not duplicated in payload fields. Most communications on the mesh network are these tag beacon messages.

GRIDSAT Message Format to cloud Infrastructure: The GRID tag beacon messages are aggregated along with the GRIDSAT tag message and sent from the GRID-SAT tag to the server over the Iridium satellite network to the cloud infrastructure for interpretation and further processing for final display on the mapping user interface.

Multi-Block Packet Header: When a GRIDSAT message is larger than the Iridium's Short Burst Data (SBD) message payload of 340 bytes, the GRIDSAT sends the message in multiple SBD packets. Each packet has a 3-byte block header followed by up to 337 bytes of the message.

Figure 2:
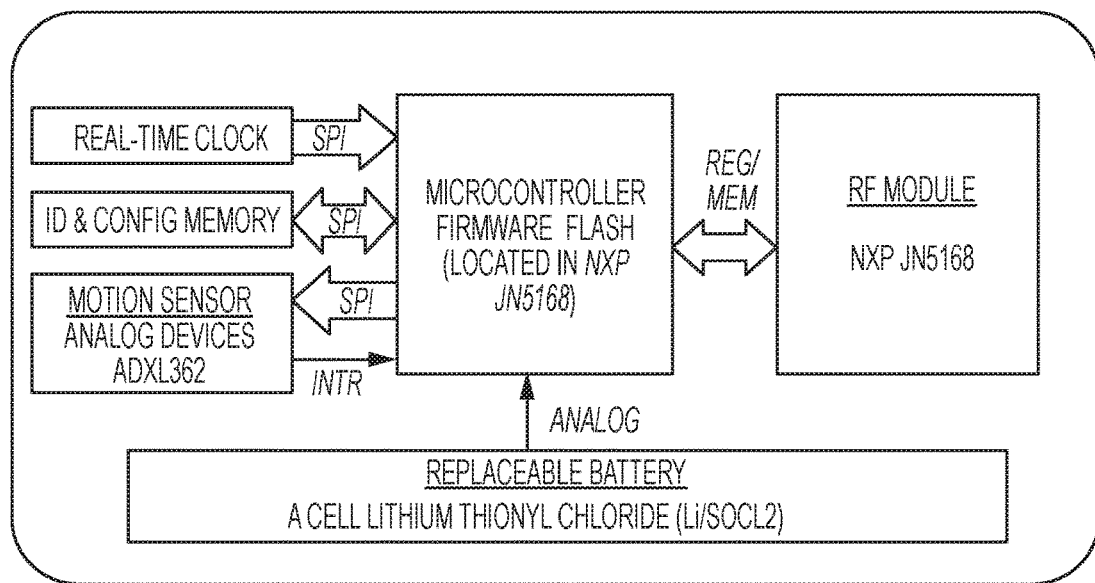
FIG. 2 is a block diagram of the internal components of the GRID tag.

FIG. 2 shows a GRID tag architecture block diagram. The design includes a battery 30 as a power supply, a Micro Control Unit (MCU) 32 and Radio Frequency (RF) module 34 operating at 2.4 gigahertz and implementing 802.15.4, 6LoWPAN, with enhanced functionality. The firmware was developed to improve power management and mesh network communication. The tag also includes a motion sensor (accelerometer) 36 which informs the MCU whenever the tag has been moved. Memory 38 and a real time clock 40 complete the components.

The GRID tag 10 uses the RF module 34 for all processing functions. The RF module 34 provides a multi-tasking environment that supports both a 6LoWPAN mesh network stack and application-specific tasks implementing GRID tag functions.

The network stack is configured as a router node, allowing the GRID tag 10 to communicate on the network and route messages between other nodes and the GRIDSAT tag 14. The GRID tags 10 use network discovery to identify the strongest router signal and the closest GRIDSAT tag 14 to decide which network to join. The network is self-healing: when a GRID tag 10 loses contact with its router to the GRIDSAT tag 14, it returns to discovery mode to find a new router or new network to join.

Table 1 (below) shows the internal sensors that will produce the signals needed for tag operation and power management.

| Sensor | Interface | Notes |
| --- | --- | --- |
| Motion | Serial Peripheral Interface (SPI) INTR digital motion detect signal | The accelerometer operates in low-power motion detection mode. It asserts INTR to interrupt and wake the RF module. It uses the motion wake-up to control switching from Low-Power Storage mode to Active mode. |
| Battery | Analog to Digital Converter | The MCU module computes the battery voltage, compares it to a low threshold to detect low voltage, and sets a fault status. |

Firmware. The following functions were implemented in the tag firmware to enable mesh networking and the advanced battery power management required to meet the desired GRID tag functionality and performance.

Network Stack Functions
⇒ 802.15.4 Media Access Control (MAC) layer
▶ Network joining
▶ Point-to-point communications
▶ Protocols (UDP, Internet Protocol [IP], Internet Control Message Protocol [ICMP])
⇒ 6LoWPAN layer configured as a router
▶ Maintain routing tables and neighbor lists
▶ Route unicast messages through network
▶ Rebroadcast broadcast and multicast messages GRID Tag Functions
⇒ Initialize and configure network stack
⇒ Initialize GRID tag functions
⇒ In deployed (active) state
▶ Periodically send GRID tag report to GRIDSAT tag (if joined to a network)
▶ Read battery voltage
▶ Process parameter, get and set messages from maintenance network
▶ A switch to the storage state will be determined by the amount of time no motion is detected
⇒ In Storage State
▶ Periodically send beacon message ▶ Time motion-detected signals to determine when to switch to deployed (active) state.

Figure 5:
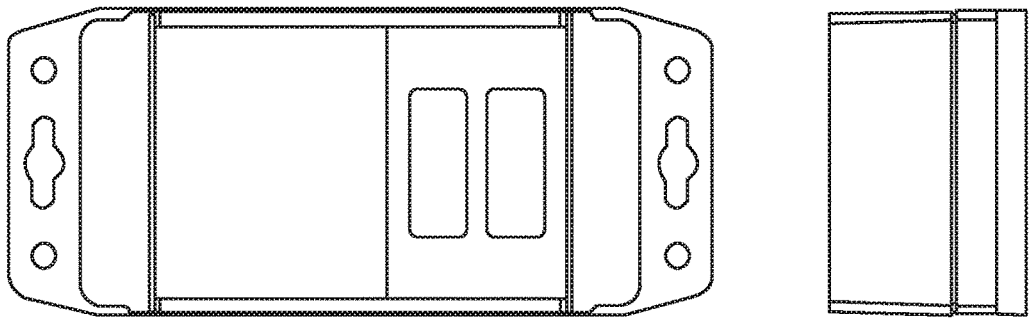
FIG. 5 shows dimensional drawings of the GRID tag enclosure with FIG. 5A showing the enclosure from above and FIG. 5B showing the enclosure from one end.

Enclosure FIG. 5 shows diagrams of the enclosure which is constructed of thick-walled polycarbonate plastic with elastomer and pressurized screws to provide IP67 (Ingress Protection) sealing. The enclosure can be coated by conformal deposition of a hydrophobic material including Parylene C or a dedicated antenna hydrophobic position locator pad. FIG. 5A shows the enclosure from above while FIG. 5B shows the container from the end. In FIG. 5A the length L is 5.92 in. (150.4 mm); in FIG. 5B the height H is 1.65 in. (41.9 mm) while the width W is 2.59 in. (65.79 mm).

Figure 3:
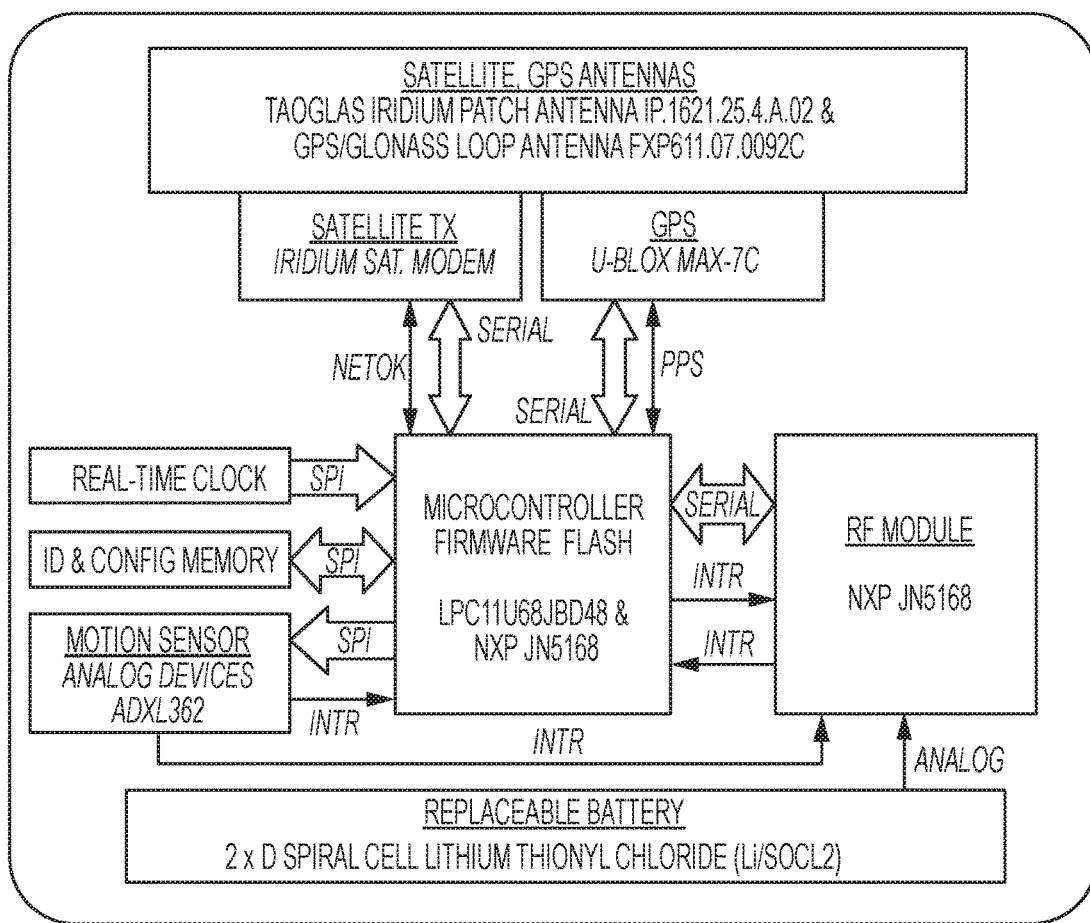
FIG. 3 is a block diagram of the internal components of the GRIDSAT tag.

FIG. 3 shows a GRIDSAT tag 14 architecture block diagram. The hardware includes the MCU 32, RF module 34, and high capacity batteries 31. Additionally, the hardware includes a satellite modem 42 and a GPS module 44 as well as a satellite-GPS antenna 46. The firmware was developed to provide improved power management and mesh network communication.

The GRIDSAT tag architecture includes an MCU 32 to act as a border router host, providing the gateway between external communications and the mesh network GRID tags 10. It directly interfaces with the GRIDSAT tag sensors, GPS module 44, Iridium modem 42, and RF module 34.

The RF module 34 is the same one used for the GRID tags 10, but runs different firmware. The RF module 34 functions as the border router node (coordinator), maintaining lists of joined tags, and sending network beacons to synchronize mesh communications. It interfaces with the MCU 32 over an asynchronous serial interface, and has a digital output interrupt signal (INTR) to wake the MCU 32 whenever the RF module 34 needs to communicate with the MCU 32. The MCU 32 has sensor inputs for battery voltage and the accelerometer and directly interfaces with them and the GPS module. Parameters define polling rates for each sensor and the calibration/conversion coefficients.

Iridium Modem. The GRIDSAT tag 14 uses the Iridium 9603 modem module 42 for communications with the cloud server 24 and GIS interface 26 by periodically sending GRIDSAT Tag Domain Reports 16.

Firmware and Algorithms. Firmware on the GRIDSAT tag 14 was designed to implement the mesh networking communication, satellite communication, and power management. The MCU 32 sleeps most of the time, but wakes to process messages from the RF module 34 and for periodic server update cycles. The server update cycle is activated whenever the MCU 32 has gathered the information needed to create the GRIDSAT Tag Domain Report 16, including checking system status and waiting for a GPS fix. The following are key MCU functions:

MCU Handling of Messages from the RF Module:
⇒ Receives GRID tag reports—update information in GRID tag table
⇒ Receives join/drop notifications—update GRID tag table
⇒ Receives battery level—update GRIDSAT status
⇒ Receives motion detection—initiate timer to determine state change For each server update cycle, the MCU performs the following operations:
⇒ Powers on GPS and waits for a stable fix, then powers off GPS
⇒ Generates GRIDSAT report
⇒ Powers on Iridium modem
  ▶ Waits for satellite detection
  ▶ Connects to satellite and opens channel for communications
  ▶ Sends GRIDSAT report using SBD (Iridium Short Burst Data) protocol
  ▶ Waits for packet acknowledgment
  ▶ Powers down Iridium modem
⇒ Sleeps until the next server update cycle or message from RF module The RF module has the following functions:
Network Stack Functions
➤ 802.15.4 MAC layer
  ◈ Network joining
  ◈ Point-to-point communications
  ◈ IP protocols (UDP, IP, ICMP)
  ◈ Sends network announcements for network discovery
  ◈ Sends network beacon polls to synchronize network communication windows
➤ 6LoWPAN layer configured as a border router
  ◈ Maintains routing tables and neighbor lists
  ◈ Maintains table of all nodes joined to the network
GRIDSAT Functions
➤ Initializes and configures network stack
➤ Initializes GRIDSAT functions
➤ In deployed (active) state:
  ◈ Passes to MCU notifications of GRID tags joining the network
  ◈ Passes to MCU notifications of GRID tags dropping from the network
  ◈ Passes to MCU all UDP packets (GRID tag reports, etc.) received from network
  ◈ Sends over network all UDP packets (parameter get/set, etc.) received from MCU
  ◈ Processes command messages from MCU for GRIDSAT functions (read battery voltage, etc.)
  ◈ Sends notifications to MCU of motion detection
➤ In Storage state
  ◈ Periodically sends beacon message, otherwise radio is off
  ◈ Sends notifications to MCU of motion detection
  ◈ Periodically sends MCU reading of battery voltage Time Synchronization. The GRIDSAT tag 14 uses the GPS Coordinated Universal Time (UTC) time to set and maintain its real-time clock 40, which is GPS time plus the correction for leap seconds. It timestamps GRID tag 10 messages when received. It adds to sync beacons the current UTC time, which allows GRID tags 10 to maintain their real-time clock (RTC) 40. Therefore, network-wide RTC time is accurate to about one second.

Firmware Segment for Controlling Iridium Modem Module. The MCU 32 communicates with the Satellite Modem module 42 over an asynchronous serial interface. Data packets are sent as SBD messages to the Iridium system. The Iridium gateway 20 sends the messages to the cloud server 24 and GIS interface 26 as Mobile Originated (MO) direct IP transfers.

The payload for SBD messages is 340 bytes. This allows sending a GRIDSAT 14 message with 26 GRID tags 10 in a single packet. If a GRIDSAT network has more than 26 joined tags, then the GRIDSAT message is sent as a multi-block message.

Both the GRID tag 10 and the GRIDSAT tag 14 do not have an external on/off switch and will operate autonomously and automatically. Both the GRID tag 10 and the GRIDSAT tag 14 operate in three different modes: (1) Low Power Storage Mode (LPSM). This mode is designed for the tags to minimize power consumption during storage. Motion sensor are monitored during LPSM. Storage beacon messages may be sent for inventory purposes. (2) Active Mode. This is the mode the tags operate during deployment. In this mode, the GRIDSAT tag 14 will act as a network-coordinator host to send sync beacons and manage GRID tags 10 in its network. The GRIDSAT tag 14 will also establish the satellite communication link and run a server update cycle with GPS fix. (3) Maintenance Mode. This mode can be initiated by issuing an addressed maintenance command message to a target tag. In this mode, the configuration parameters on the tag can be retrieved and set using commanding messages.

The following Table 2 (below) compares Low Power Storage operation modes of the GRID tag and the GRIDSAT tag:

|  | GRID Tag | GRIDSAT Tag |
|---|---|---|
| Enter | When there is no motion detected for a configurable period of greater than 1 hour to greater than 1 week and tag is not joined to a mesh network. | When there is no motion detected for a configurable period of greater than 1 hour to greater than 1 week and tag is not joined to a mesh network. |
| Configured As | Low Power End Node | Low Power End Node |
| Network Status | No activity Powering down all of its subsystems except the Motion Sensor. | No activity Powering down all of its subsystems except the Motion Sensor. |
| Operation | The RF Module sets its sleep timer to the storage beacon period and monitors the Motion Sensor. It sends an optional storage beacon message at a rate configurable from 1 per hour to 1 per month. | Before the GRIDSAT tag enters LPSM, it waits for the next sync beacon and sends a beacon with network shutdown indicator, so all of the joined GRID tags will be able to also enter LPSM. The RF Module sets its sleep timer to the storage beacon period and monitors the Motion Sensor. It sends an optional storage beacon message at a rate configurable from 1 per hour to 1 per month. |

The following Table 3 (below) compares Active operation modes of the GRID tag and the GRIDSAT tag:

|  | GRID Tag | GRIDSAT Tag |
|---|---|---|
| Enter | Upon Exit of LPSM | Upon Exit of LPSM |
| Configured As | Network router. | A network coordinator host |
| Discovery | When not joined to a network, running the tag's discovery process looking for an active network to join. | N/A |
| Sync Beacon | N/A | RF Module sends network sync beacons every 1-5 minutes |
| Operation | The tag sleeps between active windows and wakes to start an active window. During the active window, the tag has the following operations: 1. The network stack handles routing and resending of traffic. 2. The network stack listens for a sync beacon from its network router. When it gets the sync beacon, it responses with an ACK message; 3. Periodically the application level sends a GRID tag report message. After end of active window, the tag listens for a maintenance command addressed to itself and enters Maintenance Mode if such message is received. | RF Module: Maintains network tables of routes and joined GRID tags based on acknowledgement to beacon. Sends notification to MCU when GRID tag joins or drops from the network. Sends received GRID tag Report Messages to MCU. After end of active window, listens for maintenance command addressed to itself and enters MM. MCU: Wakes 1-2 times per day to run a Server Update Cycle. Handles notification and report message from RF Module to maintain its GRID tag table. Powers on GPS, waits for stable GPS fix (expected to be 20 to 500 seconds), then powers down. Powers on Iridium modem, waits for connection, sends GRIDSAT and GRID tag report, powers down modem. Total on time expected to be 6 to 22 seconds. Sleeps until next Server Update Cycle. |

The following Table 4 (below) compares Maintenance operation modes of the GRID tag and the GRIDSAT tag:

|  | GRID Tag | GRIDSAT Tag |
|---|---|---|
| Enter | After receiving an addressed maintenance command message. | After receiving an addressed maintenance command message. |
| Configured As | End Node | End Node |
| Network | Commanding maintenance network | Commanding maintenance network |
| Operation | Accept set and get parameter message to allow configuration of the GRID tag. | Accept set and get parameter message to allow configuration of the GRIDSAT tag. |
| Exit | Either by command or when it drops from the maintenance network. | Either by command or when it drops from the maintenance network. |

Figure 6:
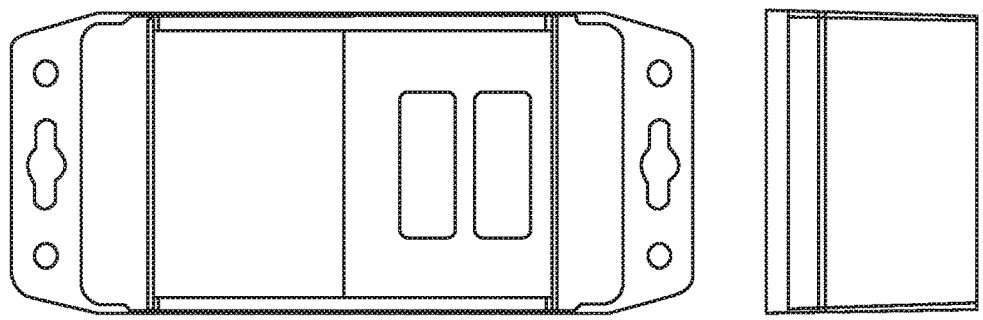
FIG. 6 shows dimensional drawings of the GRIDSAT tag container with FIG. 6A showing the enclosure from above and FIG. 5B showing the enclosure from one end.

As shown in FIG. 6, the GRIDSAT tag enclosure is very similar to the GRID tag enclosure. The enclosure employs thick-walled polycarbonate plastic with elastomer and pressurized screws to provide IP67 sealing. The enclosure can be coated by a conformal deposition of hydrophobic material including Parylene C or dedicated antenna hydrophobic position locator pads. FIG. 6A shows the enclosure from above while FIG. 6B shows the container from the end. In FIG. 6A the length L is 7.89 in. (200.41 mm); in FIG. 6B the height H is 2.44 in. (61.98 mm) while the width W is 3.57 in. (90.68 mm). When deployed the enclosure can be attached to an asset via tie wrap, zip ties, screws, tape, or other adhesives designed to meet the specific deployment requirements.

Figure 7:
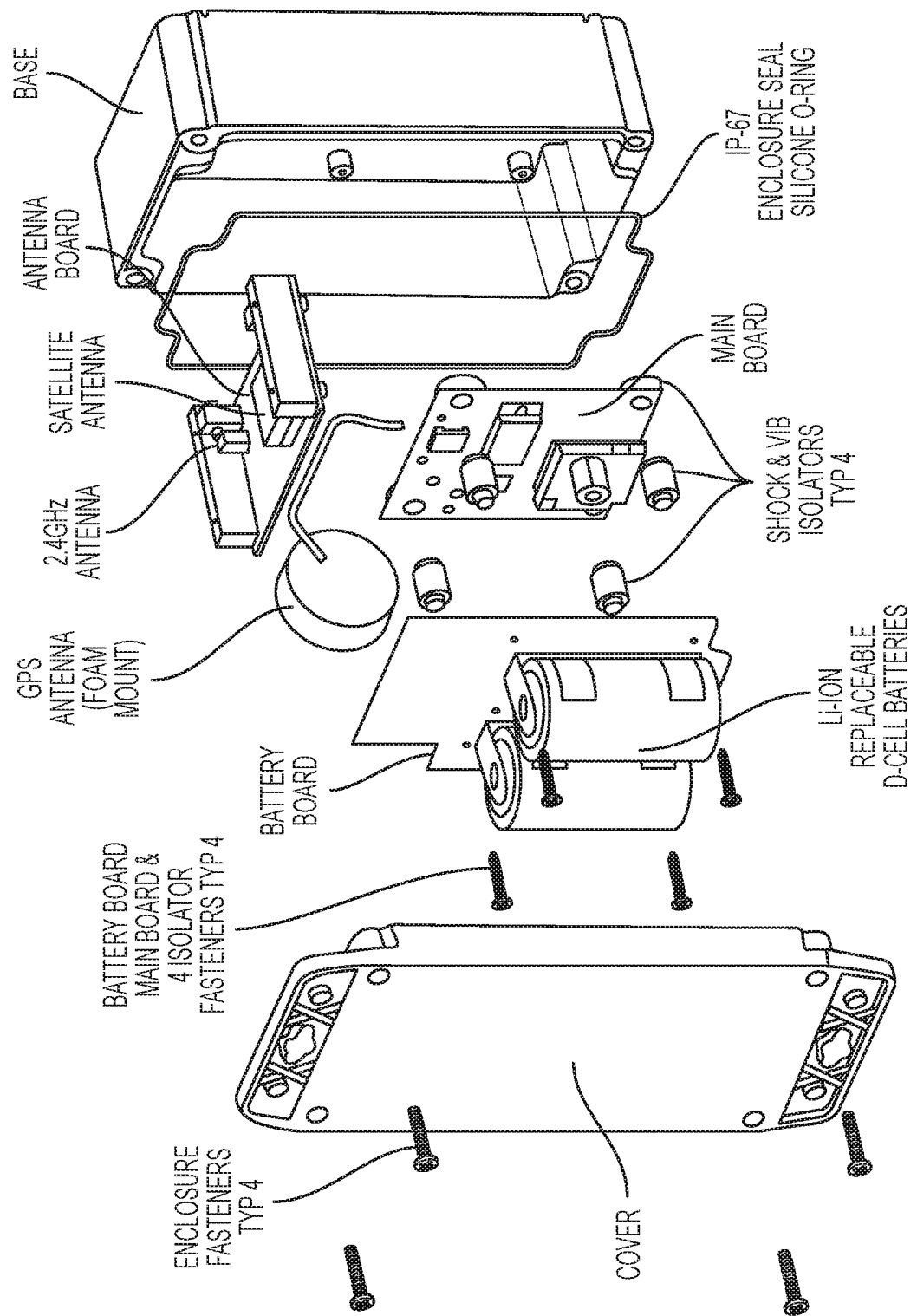
FIG. 7 is diagrammatic representation of the internal components of the GRIDSAT tag.

FIG. 7 shows a three dimensional assembly view of the GRIDSAT enclosure and components to illustrate assembly. The enclosure consists of a base 60 and cover 62. The main board 64 is located below the batteries 31. An antenna board 66 contains the satellite antenna 46" as well as the 2.4 GHz antenna for the mesh radio. The GPS antenna 46' is located apart from the antenna board.

Figure 4:
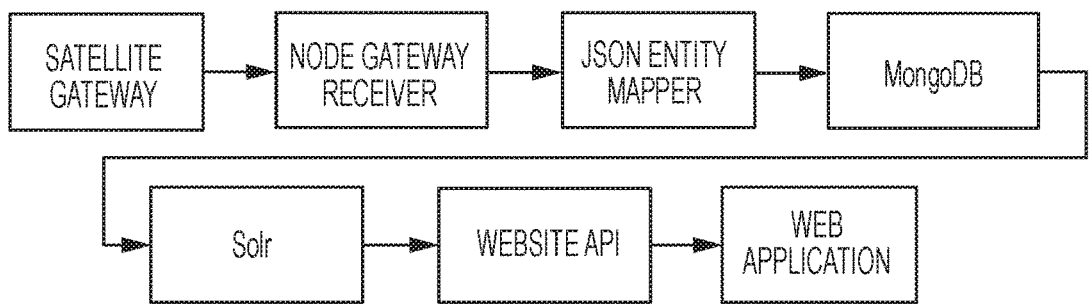
FIG. 4 is a flow diagram of the "cloud" software portion of the invention.

Cloud infrastructure provides the backend data acceptance from the satellite gateway, processing and interpreting key tag information such as location to a web-accessible map displayed for the end user. FIG. 4 diagrams the data flow within the cloud infrastructure. Data flow from the satellite gateway 20 through the Node Gateway Receiver 48 to the JSON Mapper 50. The processed data are translated by a Node Processing Engine 51 (not shown) and stored in a Mongo data base 52. The stored data are indexed by a Solr indexing engine 54. The data are passed to a website API (application programming interface) 56 and displayed to the user through a web mapping application 58. The cloud infrastructure consists of the software components listed below, which process the Tag Domain Reports 16 requested from the satellite gateway 20. In the current embodiment they are deployed and run on the Amazon Web Services cloud servers. It will be understood that the software could also be deployed on another service provider or be located on private Internet-connected servers. a brief explanation of the software components follows:

1. NginX reverse proxy—Manages incoming requests from the satellite gateway. It facilitates which ports are open and what systems can communicate through those ports. It works in tandem with the system's firewall.
2. Node Gateway Receiver 48—Listens for packages sent by the satellite, and once received, starts the processing engine.
3. JSON Entity Mapper 50—The node gateway receiver server uses the JSON configuration file to translate messages into entities the database can use. If the gateway changes protocols, or the gateway provider changes, the entity mapper can be updated without affecting the rest of the subsystem.
4. Node processing engine 51—Receives incoming messages and translates them into MongoDB database entities.
5. MongoDB database 52—Stores the translated entities from the node processing engine. The database structure defines what the entities are and the formats of each of their attributes.
6. Solr 54—The indexing engine that provides fast search capabilities.
7. Node Web server—The same server as above; however, it is used as a Web and Application Programming Interface (API) server for the mapping application.
8. Koop—Is a data translation engine that can format the database entities into a consumable format for Web-based systems.
9. Turf.js—Is a spatial data manipulation engine used to conduct spatial queries and format MongoDB data into GeoJSON.
10. Web Mapping Application 58—The user interface that displays interactive features that represent the tags in the field and the messages and status that they emit over time. "Leaflet" is currently the application of choice. Leaflet is free to use but does not contain map imagery. Therefore, Map Box (a paid service that provides base maps) is combined with Leaflet to provide the necessary map imagery.

The Cloud-Based Data Server hardware that was chosen for this project is sufficient for prototyping and proof of concept. Because of Amazon web service's scalability, what is done on a small scale using the Amazon platform can readily be upgraded to support a larger, production-ready environment. The hardware chosen is suitable to support all software components of this project including, NginX, the Node Ingestion server, MongoDB database, and the web-mapping application. The Amazon Web Services data centers are staffed 24/7 by trained security guards, contain environmental systems to minimize the impact of disruptions, and span multiple geographic regions to provide resiliency to both manmade and natural disasters.

GIS Software Application Package. After the NginX reverse proxy accepts the incoming requests from the satellite gateway, the GIS software application package 26, mentioned above, that consists of the node gateway receiver and processing server uses the JSON entity mapper to parse the GRIDSAT tag, produce Tag Domain Reports, and store the data in the MongoDB database deployed on the Amazon Web Services server. After the data are stored, they are immediately indexed and made available to search using the front end mapping application.

Mapping API. The user interface is designed to provide all of the desired functionality while maintaining ease of use for novice users. Desired functionality is as follows:
GRIDSAT tags viewable on a map;
Visible status indication of GRIDSAT tags;
Clicking GRIDSAT tags displays additional information about GRID tags;
User can review the history details of the GRIDSAT tags.

A "House of Quality" QFD (quality function deployment) was performed to assess factors affecting the quality of the system. Table 5 (below) shows the derived House of Quality, where Interrelationship Weightings indicate values for which a value of 1 represents Weak, a value of 3 represents Moderate, and a value of 9 represents Strong:

| | | Engineering Requirements GRID Tag | | | | | |
|---|---|---|---|---|---|---|---|
| Customer Requirements | Importance wt. | Point-to-Point RF Communication 1 | Firmware 2 | Deployment Means 3 | Physical Design 4 | Battery Power 5 | Tag Longevity 6 |
| 1 Mark Equipment Location | 0.25 | 3 | 3 | 3 | 3 | 3 | 3 |
| 2 On Station >6-9 months | 0.15 | 9 | 3 | 3 | | 9 | 9 |
| 3 Compact Size | 0.05 | 9 | | 3 | 9 | 9 | 3 |
| 4 Compatible w/Marine Environment | 0.15 | 3 | | 9 | 9 | 3 | 3 |
| 5 Temperature Range (to −40 C.) | 0.15 | 3 | | 9 | 9 | 3 | 3 |
| 6 Ease of Deployment | 0.05 | | | 9 | 9 | | |
| 7 Cost Effective | 0.05 | 3 | 9 | 3 | 9 | 9 | 3 |
| 8 Communication Range | 0.10 | 9 | 9 | 3 | 3 | 9 | 3 |
| 9 Maximum use of COTS Products | 0.05 | 3 | 3 | 1 | 3 | 3 | 1 |
| 10 Initial Importance | 1.00 | 4.65 | 2.70 | 5.00 | 5.25 | 4.95 | 3.65 |

| | Engineering Requirements GRIDSAT Tag | | | | | | | |
|---|---|---|---|---|---|---|---|---|
| Customer Requirements | Point-to-Point RF Communication 7 | Satellite Communication 8 | GPS Module 9 | Firmware 10 | Deployment Means 11 | Physical Design 12 | Battery Power 13 | Tag Longevity 14 |
| 1 Mark Equipment Location | 3 | 3 | 9 | 3 | 3 | 3 | 3 | 3 |
| 2 On Station >6-9 months | 9 | 9 | 9 | | 3 | | 9 | 9 |
| 3 Compact Size | 9 | 9 | 9 | | 3 | 9 | 9 | 3 |
| 4 Compatible w/Marine Environment | 3 | 9 | 3 | | 9 | 9 | 3 | 3 |
| 5 Temperature Range (to −40 C.) | 3 | 9 | 3 | | 9 | 9 | 3 | 3 |
| 6 Ease of Deployment | | 9 | 9 | | 9 | 9 | | |
| 7 Cost Effective | 3 | 9 | 9 | 9 | 3 | 9 | 9 | 3 |
| 8 Communication Range | 9 | 9 | 3 | 9 | 3 | 3 | 9 | 3 |
| 9 Maximum use of COTS Products | 3 | 9 | 9 | 3 | 1 | 3 | 3 | 1 |
| 10 Initial Importance | 4.65 | 7.50 | 6.60 | 2.25 | 5.00 | 5.25 | 4.95 | 3.65 |

Based the analysis from House of Quality, Satellite Communication received the highest technical priority. Satellite communication's importance comes from three major aspects: (1) It provides the critical link for data transfer between mesh network and the cloud server; (2) Integration of the satellite modem into GRIDSAT has impacts in form factor, size and cost; (3) Operation of satellite communication in the GRIDSAT tag is a main contributor for power consumption; therefore, selection and sizing of battery are affected.

Essentially all of the system components are "off the shelf" making the system cost effective and easy to assemble. Table 6 (below) provide component information:

| | | Weight (grams) | Cost ($) |
|---|---|---|---|
| | Key GRID Tag BOM Item | | |
| 1 | RF and MCU chipset with PA & LNA, JN5168-001-M06 | <3 | <19 |
| 2 | Power regulator, TPS781 | <0.5 | <0.5 |
| 3 | Power regulator, LD39100 | <1 | <0.7 |
| 4 | Motion & acceleration sensor, ADXL362 | <0.5 | <4 |
| 5 | Antenna, ANT-2.4-JJB | <2 | <2.20 |
| 6 | Battery primary A cell Bobbin, LS17500 | <22 | <4.5 |
| 7 | Enclosure | <140 | <15 |
| | Key GRIDSAT Tag BOM Item | | |
| 1 | Satellite module, Iridium 9603 | 11.5 | <175 |
| 2 | GPS module, MAX_7 | <1 | <59 |
| 3 | RF and MCU chipset with PA & LNA, JN5168-001-M06 | <3 | <19 |
| 4 | MCU, LPC11U68JBD48 | <1 | <4 |
| 5 | Iridium antenna, IP.1621.25.4.A.02 | 10 | <6.5 |

-continued

| | | Weight (grams) | Cost ($) |
|---|---|---|---|
| 6 | GPS antenna, FXP611.07.0092C | <2 | <14 |
| 7 | Mesh antenna, ANT-2.4-JJB | <2 | <2.20 |
| 8 | Motion & acceleration sensor, ADXL362 | <0.5 | <4 |
| 9 | Power conversion IC, TPS63060 | <0.5 | <3.2 |
| 10 | Power conversion IC, LTC3103 | <0.5 | <4 |
| 11 | Power regulator, LP3962 | <0.5 | <3 |
| 12 | Power regulator, TLV70233 | <0.5 | <0.5 |
| 13 | Power regulator, TPS781 | <0.5 | <0.5 |
| 14 | Battery primary 2 × D cell Spiral, ER34615M | <220 | <15 |
| 15 | Enclosure | <260 | <18 |
| | Key Cloud Infrastructure BOM Item | | |
| 1 | Satellite Gateway, Iridium (DISA) | N/A | 0 |
| 2 | Servers, Amazon Web Services, EC2 General Purpose Previous Gen. m1.small + 10 GB Elastic Block Store (EBS) @ 2.35 GHz | N/A | 33/month |
| 3 | GIS software application package, Node w/Koop, Version 0.10.32 | N/A | 0 |
| 4 | HTTP server and reverse proxy, NginX, Version 1.4.0 | N/A | 0 |
| 5 | Mapping API, Leaflet, Version 0.6.4 | N/A | 0 |

Table 7 (below) represents the GRID and GRIDSAT tags' estimated mean time to failure (MTTF). MTTF (Hours) is determined by adding up the total failure rates and calculating (1/(Total Failure Rates/1,000,000 hours)):

| Estimated Mean Time To Failure Analysis for GRID and GRIDSAT Tags | | | |
|---|---|---|---|
| Item No. | Item | Quantity | Failure Rate (FPMH) |
| GRID | | | |
| | RF Module | 1 | 1 |
| | MCU | 1 | 0.1 |
| | Enclosure | 1 | 3 |
| | Motion Sensor | 1 | 1 |
| | Flash | 1 | 0.1 |
| | | Total Failure Rate | 5.2 |
| | | MTTF (Hours) | 192,308 |
| | | MTTF (Years) | 21.95 |
| GRIDSAT | | | |
| | RF Module | 1 | 1 |
| | GPS | 1 | 1 |
| | MCU | 1 | 0.1 |
| | Sat Modem | 1 | 1 |
| | Enclosure | 1 | 3 |
| | Motion Sensor | 1 | 1 |
| | Flash | 1 | 0.1 |
| | | Total Failure Rate | 7.2 |
| | | MTTF (Hours) | 138,889 |
| | | MTTF (Years) | 15.85 |

The estimated MTTF are 21.95 years and 15.85 years for GRID Tag and GRIDSAT Tag, respectively. The estimations did not include the batteries for both tags. With the inclusion of a battery with 10 FPMH in the model for calculation will bring MTTF for GRID Tag to 7.51 years, which is 2-5× longer than the battery life. Similarly for GRIDSAT Tag, MTTF with battery will be 4.20 years, more than 4× of the battery life designed for this application.

Table 8 below summarizes the mesh signal budget and link reliability between two adjacent mesh nodes (i.e. point-to-point mesh link) for GRID and GRIDSAT tags. The link budget is also derived for the case where transmit power amplifier (PA) and receive low nose amplifier (LNA) are added. The addition of PA and LNA provides a link reliability of greater than 99% over 1200 ft. (365.8 m) range for typical environment loss conditions due to multi-path, fading, orientation, enclosure, etc. In the high environment loss conditions which include an additional 20 dB loss over typical conditions caused by various effects, including ice formation, the 99% reliable range of 420 ft. (128 m) is obtained. The 99% reliable range for the tags without PA and LNA under typical loss conditions is 400 ft. (122 m).

Environmental testing included operation at temperature extremes, water immersion, shock, and vibration. The results are presented in the following paragraphs for both the GRIDSAT and GRID tags.

Temperature. The Tenney BTRC (Benchmaster Temperature/Relative Humidity Test Chamber) environmental chamber was used to test the system from −50° C.) to 80° C. The mesh, GPS, and Iridium modem antennas were connected outside of the chamber with cables. The mesh network beacon rate was set to 10 seconds, and system functionality was verified by successful beaconing by the GRID tag to the GRIDSAT and reporting to the satellite by initiating a transmission through the GRIDSAT universal serial bus (USB) interface over time and temperature extremes. We employed Saft 17500 and Xeno XL-100F A-cell batteries for GRID tags in our tests that showed current delivery deterioration at temperatures above 75° C. which in some instances affected the tag's functionality. The GRIDSAT batteries Fanso ER34615M D-cell worked without any interruption in all the tests conducted up to 81° C., and all batteries operated successfully down to −50° C.

GRIDSAT and GRID tags were both subjected to the water immersion test at greater than 1.1 meters. The temperature was at 25° C. plus or minus 5° C. for 15 minutes, 1 hour, and 12 hours in three separate tests, which all resulted in no leaks. A drop test (high gravity test) on concrete was performed. The GRID and GRIDSAT tags were dropped onto a concrete floor four times each from a height of 6 ft. (1.83 m) and no damage was observed. The devices were tested on an Unholtz-Dickie shaker system (Model 630) at the laboratories of the Electrical and Computer Engineering department of University of Michigan to simulate vibrational conditions. The peak acceleration was set to 5 g at the 20 to 2,000 Hz frequency range. After the vibration tests, the devices were opened for visual inspection and verified to be fully functional.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it

| Mesh Link Budget (single hop) | w/o PA & LNA | | With PA & LNA | |
|---|---|---|---|---|
| | Typical conditions | Lossy conditions (wet, thin ice, etc.) | Typical conditions | Lossy conditions (wet, thin ice, etc.) |
| Tx Power | 2.5 dBm | 2.5 dBm | 22 dBm | 22 dBm |
| Rx Sensitivity | −95 dBm | −95 dBm | −100 dBm | −100 dBm |
| Tx/Rx Antenna Gain | −1 dB | −1 dB | −1 dB | −1 dB |
| Tx Loss | 2 dB | 2 dB | 2 dB | 2 dB |
| Propagation Loss | 78 dB @ 300 ft. (91.4 m) | 78 dB @ 300 ft. (91.4 m) | 100 dB @ 1000 ft. (304.8 m) | 100 dB @ 1000 ft. (304.8 m) |
| Rx Loss | 2 dB | 2 dB | 2 dB | 2 dB |
| Other environment related losses | 8 dB | 18 dB | 8 dB | 28 dB |
| Link reliability >99% Range | Range <400 ft. (122 m) | Range <240 ft. (73.2 m) | Range <1200 ft. (365.8 m) | Range <420 ft. (128 m) |

What is claimed is:

1. A geo-referencing Tag system for remote locating and tracking, the geo-referencing Tag system comprising:
   a plurality of data transmission tags, each tag comprising:
      a power source;
      a microcontroller;
      at least one environmental sensor; and
      a communication module configured to communicate with at least one satellite tag and one or more data transmission tags,
   and
   the at least one satellite tag, the at least one satellite tag being configured to be positioned proximate to the data transmission tags, and the at least one satellite tag being configured to communicate with the plurality of data transmission tags and route data via satellite which is generated by the data transmission tags to a Geographical Information System user interface, the at least one satellite tag comprising;
      a power source;
      a microcontroller;
      a GPS receiver;
      at least one environmental sensor;
      a satellite modem being configured to communicate with the satellite; and
      a communication module being configured to communicate with the plurality of data transmission tags,
   wherein the at least one satellite tag is configured to aggregate information obtained from a mesh network formed based on the data transmission tags and the at least one satellite tag, the information being generated by the data transmission tags, and wherein the at least one satellite tag is configured to supplement the aggregated information with location information comprising its GPS position and transmit the aggregated information via the satellite.

2. The geo-referencing Tag system of claim 1, wherein the data transmission tags comprise:
   an accelerometer as an environmental sensor; and
   a radio frequency module as a communication module for establishing the mesh network; and
   wherein the satellite tag comprises:
      a radio frequency module as a communication module for communicating with the mesh network and transmitting commands to the mesh network.

3. The geo-referencing Tag system of claim 2, wherein a particular tag is configured to become active based on detection of motion via the accelerometer, or wherein the particular tag becomes active based on a predefined interval elapsing or based on a command being received.

4. The geo-referencing Tag system of claim 2, wherein the mesh network between tags is automatically formed and information is transmitted at regular intervals between tags and to the Geographical Information System user interface.

5. The geo-referencing Tag system of claim 1, wherein output of the environmental sensors is included in affects communication between the tags.

6. The geo-referencing Tag system of claim 5, wherein the environmental sensors detect environmental factors selected from the group consisting of temperature, electromagnetic radiation, particle radiation, pH, turbidity and motion.

7. The geo-referencing Tag system of claim 1 configured to track ice floes wherein the data transmission tags comprise:
   a pressure sensor as an environmental sensor;
   a subsurface transducer for sending and receiving; and
   a Lamb/Rayleigh wave transducer as a communication module for transmitting a guided wave to other data transmission tags and the satellite tag, without a local field or fixed electrical, civil, mechanical, structural, or wireless infrastructure being required for operation; and
   wherein the satellite tag comprises:
      a Lamb/Rayleigh wave detector as a communication module for receiving guided waves and transmitting commands to the data transmission tags.

8. The geo-referencing Tag system of claim 7, wherein the at least one satellite tag further comprises hardware for mounting said tag onto ice.

9. The geo-referencing Tag system of claim 1, wherein the information obtained form the mesh network does not include location information.

* * * * *